United States Patent [19]
Matsuoka et al.

[11] Patent Number: 4,826,516
[45] Date of Patent: May 2, 1989

[54] MOISTURE-REMOVER AND MOISTURE-REMOVING APPARATUS

[75] Inventors: Akira Matsuoka; Kazuhiko Asano, both of Osaka, Japan

[73] Assignee: Daiken Kogyo Kabushiki Kaisha, Toyama, Japan

[21] Appl. No.: 97,885

[22] Filed: Sep. 17, 1987

[30] Foreign Application Priority Data

Sep. 18, 1986 [JP] Japan .............................. 61-220375
Mar. 5, 1987 [JP] Japan .............................. 62-51037
May 30, 1987 [JP] Japan .............................. 62-137521

[51] Int. Cl.$^4$ ............................................. B01D 39/00
[52] U.S. Cl. ......................................... 55/388; 55/316; 55/524; 55/389; 502/527; 502/400; 502/401
[58] Field of Search ...................... 55/316, 388–389, 55/524; 502/527, 400–404

[56] References Cited

U.S. PATENT DOCUMENTS

| | | | |
|---|---|---|---|
| 2,225,990 | 12/1940 | Henry | 55/387 |
| 3,170,872 | 2/1965 | Balogh et al. | 55/387 |
| 3,505,794 | 4/1970 | Nutter et al. | 55/498 |
| 4,595,403 | 6/1986 | Sago et al. | 55/389 |

FOREIGN PATENT DOCUMENTS 28639 3/1981 Japan .............................. 55/387

Primary Examiner—Bernard Nozick
Attorney, Agent, or Firm—Edwin E. Greigg

[57] ABSTRACT

A moisture remover and a moisture removing apparatus which comprise a porous body and moisture-absorbing fillers basically. The porous body has continuous fine voids having a mean hole-diameter of 10 microns or less and a hollow portion therein to take out moisture and/or water. The moisture removing apparatus further comprises suction pump means for facilitating drawing of the moisture and/or the water.

15 Claims, 4 Drawing Sheets

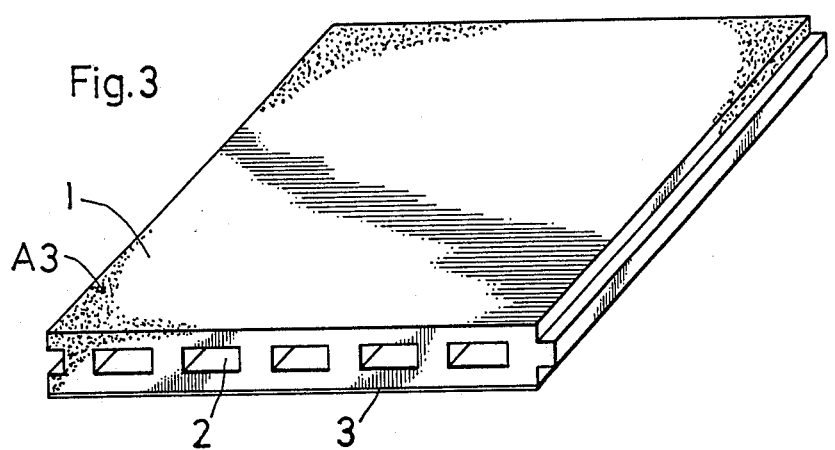
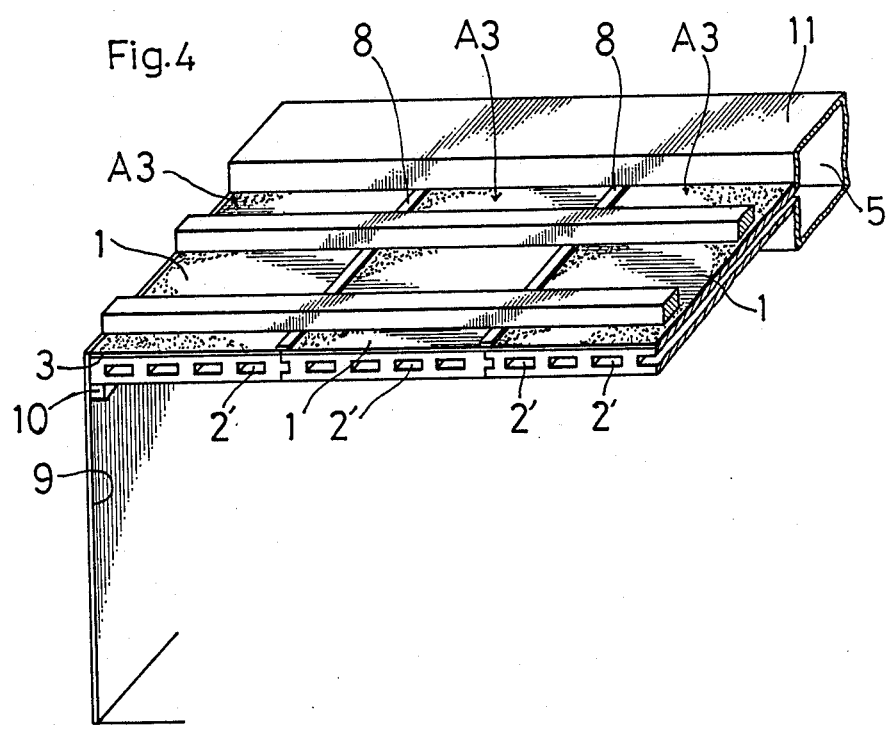

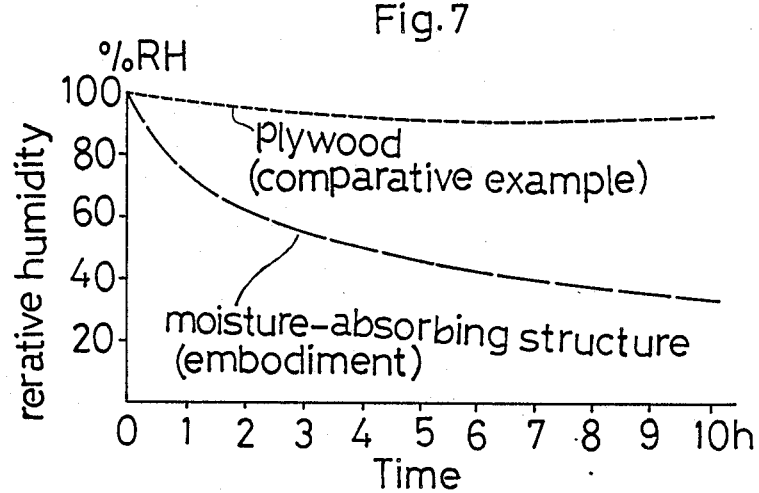
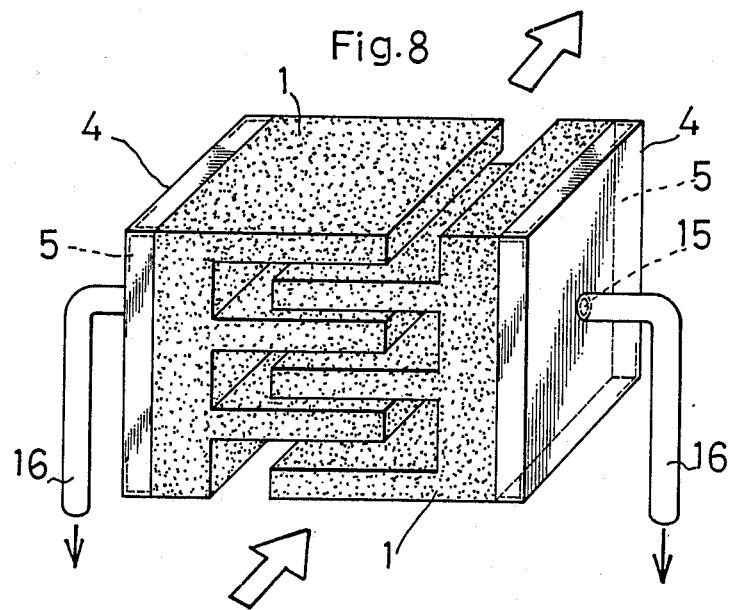

MOISTURE-REMOVER AND MOISTURE-REMOVING APPARATUS

BACKGROUND OF THE INVENTION (1) Field of the Invention

The present invention relates to a moisture-remover and a moisture-removing apparatus for absorbing a moisture within a room, condensing the absorbed moisture and discharging the condensed moisture out of a system through a moisture-removing structure.

(2) Description of the Prior Art

In order to remove a moisture from an air, an adsorption method, in which a moisture in an air is taken in an asbestos paper, sheet paper, cloth and the like impregnated with a moisture-absorbing material in the form of adsorbed water has been used in addition to a cooling moisture content reduction method, in which an air is circulated and cooled to condense a moisture thereby removing the moisture, and a compression cooling method, in which an air is compressed and cooled to condense a moisture thereby removing the moisture.

However, of the above described conventional moisture-removing methods the former two methods have a disadvantage in that large facilities are required for the cooling and compression since the circulation must be produced within a vacant portion of a room.

Accordingly, an idea that if a differential pressure is given by a vacuum pump to pass an air containing a moisture through a minute hole having a diameter of about 10 Å, the moisture can be taken out in the form of condensed water has been proposed (Proc. 4th. Int. Drying Symp (Kyoto), Vol. 2, 1984, pp. 712 to 718) but that idea has never been practiced yet since a penetrating structure is difficult to produce and water can not be taken out until the vacant portion of the room is decompressed nearly to a vacuum.

On the contrary, it is necessary in the absorption method only to use an asbestos paper, a sheet paper, a cloth and the like impregnated with a moisture-absorbing agent. Accordingly, the absorption method has an advantage in that it is convenient while a problem occurs in that a moisture taken in from a moisture-suction side is liquefied within voids and then transferred to a moisture-discharge side in the form of water, whereby the moisture-absorbing property, that is to say the moisture-removing property, cannot be held for a long time.

SUMMARY OF THE INVENTION

The present invention has been achieved in view of the above described matters and taking notice that if a porous body is provided with minute diameter voids in a base material containing moisture-absorbing fillers and a shape of said base material are suitably specified, a moisture in an air can be taken in, vaporized and discharged by giving a differential pressure between a moisture-suction side and a moisture-discharge side.

It is an object of the present invention to provide a moisture-remover capable of holding a moisture removing operation for a long period in spite of a simplified construction without flowing out a large quantity of moisture-absorbing filler.

(1) In order to achieve the above described object, a moisture remover according to the first invention comprises a porous body having continuous fine voids having a mean hole-diameter of 10 microns or less, and moisture-absorbing fillers filled within the voids of the porous body wherein a hollow portion is formed in the porous body to communicate with the outside thereof.

(2) In a second invention, a moisture removing apparatus according to this invention comprises a porous body having continuous fine voids having a mean hole-diameter of 10 microns or less, moisture-absorbing fillers filled within the voids of the porous body, said porous body being provided with a hollow portion therein to communicate with the outside thereof, and suction pump means for decompressing said hollow portion.

(3) In a third invention, a moisture removing apparatus according to this invention comprises a porous body having continuous fine voids having a mean hole-diameter of 10 microns or less, moisture-absorbing fillers filled within the voids of the porous body, a cover member provided with the porous body to form a space portion on the surface of the porous body, and suction pump means for decompressing the space portion.

According to the present invention, a moisture in a room is taken in the moisture-absorbing structure by the moisture-absorbing fillers, and (1) the moisture absorbed in the moisture-absorbing structure tends to move toward a lower vapor pressure gradient in the moisture-absorbing structure.

(2) In this time, since moisture-absorbing fillers exist within voids, the movement of the moisture is promoted even at a minute differential vapor pressure.

(3) And, in the case where a right side (indoor side) is highly humid, the absorbed moisture is transferred to an opposite side and an inner surface side of the hollow portion.

(4) Upon subjecting the space portion provided in the hollow portion and the opposite surface side to the suction to give a differential pressure, thereby condensing the moisture and discharging the moisture out of the system, a water vapor pressure in the space portion is reduced and as a result, a moisture-discharging capacity within the hollow portion and on the opposite surface side is not reduced and the continuous moisture-discharge on the opposite surface of the moisture-absorbing structure becomes possible, whereby the moisture is continuously transferred from the right surface side to the opposite surface side. Accordingly, an inside of the moisture-absorbing structure is not saturated and it is not dewed on a surface of the moisture-absorbing structure.

The moisture in the room is removed in the above described mechanism.

In particular, according to the present invention, since the moisture-absorbing fillers are added and held in inorganic porous materials having fine voids having a mean hole-diameter of 10 microns or less, the moisture in an air is taken in from the moisture-suction side (right surface side) and condensed in the fine voids to be turned into water and partially charged in capillary tubes. And, upon decompressing the moisture-discharge side (hollow portion) to an extent of 20 to 700 mm Hg, the above described condensed water tends to move toward the moisture-discharge side through spaces complicated in shape among voids in the porous materials but the moisture penetrates in the form of gas on the moisture-discharge side under the influence of a cohesive force of fine voids and the like. This discharge in the form of gas leads to the prevention of the moisture absorbing fillers from flowing out.

As above described, since the porous materials having a mean hole-diameter of 10 microns or less are subjected to the suction, an uneven suction is reduced even though the decompression degree is little, whereby the suction portion can be easily sealed up. Accordingly, an energy consumption required for the removal of moisture can be reduced and the moisture-removing operation can be efficiently achieved.

In addition, in the case where the moisture-insulating layer is provided, the partial saturation is produced in the vicinity of the moisture-insulating layer to produce a reverse water-content gradient but since the moisture is discharged from the hollow portion, the indoor side is not saturated with the moisture and it is not dewed. Since the moisture-absorbing structure comprises the hollow portion therein, the moisture held in the moisture-absorbing structure is discharged in the hollow portion, whereby an inside of the hollow portion becomes highly humid, and the moisture is discharged by the suction means out of the moisture-absorbing structure from the hollow portion.

As above described, according to a moisture-remover of the present invention, since a moisture in an air can be taken in from a moisture-absorbing side (surface portion) to vaporize and discharged from a moisture-discharging side, the flowing out of moisture-absorbing fillers can be reduced and the moisture-removing operation can be satisfactorily maintained for a long time. Moreover, the transference of a moisture from the moisture-absorbing side (right surface side) to the moisture-discharging side (opposite surface side) can be easily achieved at a reduced differential pressure and as a result, the moisture can be removed without circulating an air in the room and an indoor temperature does not escape outside. Besides, a reduced suction is different for the removal of the moisture and the moisture-removal can be achieved at a reduced energy consumption by the use of a simplified construction without producing an uneven suction, whereby the moisture-removing penetrating structure according to the present invention can be used as a simplified and highly efficient moisture-removing apparatus.

In addition, since the moisture taken in the moisture-absorbing structure can be continuously discharged, water vapor is always transferred to the opposite surface side and as a result, the inside of the moisture-absorbing structure can be prevented from being saturated to reduce the moisture-absorbing power and it is not dewed on the surface of the moisture-absorbing structure. Furthermore, since it is not dewed on the surface portion of the moisture-absorbing structure, the moisture-absorbing fillers do not fall drop by drop together with dewed water and the surface is not very contaminated. In addition, since the moisture is continuously discharged in the space portion of the opposite surface side of the moisture-absorbing structure, the provision of a heating means and the like is not required for the regenerating of moisture-absorbing materials. Accordingly, various kinds of advantage, such as the possibility of its application to a simplified and highly efficient moisture-removing apparatus, are given.

BRIEF DESCRIPTION OF THE DRAWINGS

The drawings show embodiments of a moisture-removing penetrating structure and moisture-removing apparatus according to this invention in which:

FIG. 3 is a perspective view showing an external appearance of a third preferred embodiment of the present invention;

FIG. 4 is a partially cut off perspective view showing an example of the third preferred embodiment of the present invention;

FIG. 7 is a graph showing experimental results of FIG. 6; and

FIG. 8 is a perspective view showing a modification of the fourth preferred embodiment of the present invention.

DETAILED DESCRIPTION OF THE PREFERRED EMBODIMENTS

The porous materials comprising a porous body used in the present invention include single porous materials, such as (1) inorganic materials such as plaster, cement, calcium silicate, rock wool, ceramics, sintered bodies and the like, (2) wooden sheet materials such as plywood, fiber board, particle board and sheet paper, and (3) porous materials such as polyvinyl chloride sheet of which pore diameter is adjusted by foaming, polyolefine sheet of which pore diameter is adjusted by extending, paper of which pore diameter is adjusted by coating synthetic resins and the like and fibrous sheet of which pore diameter is adjusted by compressing, or their composites, and are not so easily broken and deformed when they absorb the moisture. In addition, said porous materials preferably have a moisture-absorbing coefficient of $1 \times 10^{-3}$ g/m·h·mmHg or more and a heat conduction resistance of 2.0 m·h·°C/kcal or more so that it may not be dewed on the surface thereof an in view of the insulation. In addition, porous materials having a mean pore-diameter of 10 microns or less are preferably used in view of the holding of the moisture-absorbing fillers or sorbents.

The moisture-absorbing fillers or sorbents according to the present invention include (1) deliquescent substances such as calcium chloride and lithium chloride, (2) water-soluble high molecules such as diethylene glycol, triethylene glycol, glycerine sodium polyacrylate and PVA, (3) inorganic moisture-absorbing materials such as bentonite, sepiolite, zeolite, activated alumina, xonotlite, activated carbon and molecular sieves, and (4) water-insoluble high molecular moisture-absorbing materials such as grafted starch and isobutylene maleate anhydride used singly or in combination.

These moisture-absorbing fillers are added in the porous materials to form the moisture-absorbing structure. The moisture-absorbing fillers are added in the porous materials by dissolving the above described moisture-absorbing fillers and impregnating the porous materials with the resulting solution or blending the moisture-absorbing fillers with raw materials of the porous materials to harden in the molding. In particular, in the case where the inorganic moisture-absorbing materials, such as bentonite, diethylene glycol and the like are mixed with water and the resulting mixture is blended with cement and plaster, and the resulting blend is molded, the moisture-absorbing fillers do not exude and have a moderate moisture-penetrating property.

Figure 1:
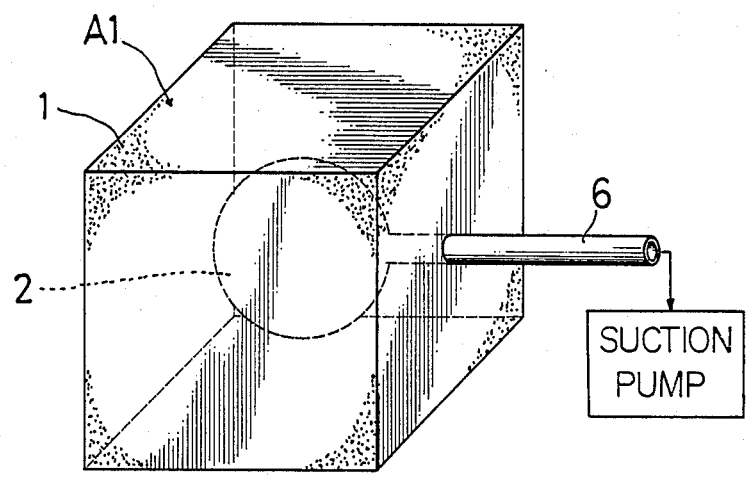
FIG. 1 is a perspective view showing an external appearance of a first preferred embodiment of the present invention.

FIG. 1 shows a moisture-removing penetrating structure ($A_1$) according to a first preferred embodiment of the present invention. Referring now to FIG. 1, reference numeral (1) designates a moisture-absorbing structure having fine voids having a mean pore-diameter of 10 microns or less, preferably 3 microns or less, and containing the moisture-absorbing fillers added and held in the fine voids. Said moisture-absorbing structure (1) is provided with a spherical hollow portion or chamber (2) formed in a central portion thereof and said hollow portion (2) is opened into an outside through a suction pipe (6) formed of a glass tube and the like. Said suction pipe (6) is connected to a suction means shown in block form at the other end so as to decompress an inside of the above described hollow portion (2). In addition, the above described suction means decompresses the inside of the hollow portion (2) to an extent of 20 to 720 mmHg in dependence upon a thickness of the moisture-absorbing structure (1) and a kind of the moisture-absorbing fillers to give a differential pressure between the inside of the hollow portion (2) and an outside. In this case, if the inside of the hollow portion (2) is decompressed to an extent of 20 mmHg or less, there is the possibility that the condensed water in the moisture-absorbing structure (1) falls down drop by drop as it is. In addition, the moisture may be not only continuously sucked by means of a suction means but also collected in the moisture-absorbing structure (1) and then intermittently sucked. Furthermore, the above described moisture-absorbing structure (1) may be provided with a moisture-transmitting layer formed of a paper, cloth and the like formed on a surface thereof or a resin sheet may be stuck to one surface to restrict a moisture-absorbing surface. Besides, in order to secure the prevention of the moisture-absorbing fillers from flowing out, an internal wall surface of the above described hollow portion (2) may be coated with a semipermeable membrane and a moisture-transmitting hydrophobic coating.

In a concrete example of the above described first preferred embodiment, plaster, water and calcium chloride are blended at a ratio of 100:100:35 and the resulting blend is molded to form a cubic moisture-removing penetrating structure ($A_1$) of 15 cm square having the spherical hollow portion (2) communicating with the air through the glass pipe (6) formed in the hollow portion (2). Upon decompressing the hollow portion unit 110 mmHg at 29° C. in an atmosphere having a RH of 75%, water was collected at a rate of 5 cc/min.

Figure 2:
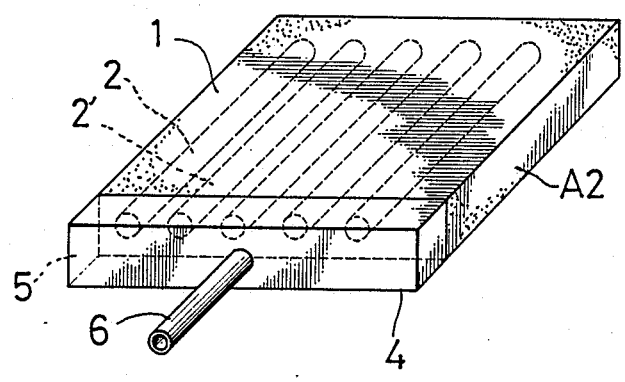
FIG. 2 is a perspective view showing an external appearance of a second preferred embodiment of the present invention.

FIG. 2 shows a moisture-removing penetrating structure ($A_2$) according to a second preferred embodiment of the present invention. Referring to FIG. 2, a moisture-absorbing structure (1) is formed in a panel shape and provided with a plurality of parallel hollow holes (2') passing through an inside thereof, one side surface, into which said hollow holes (2')—are opened, being sealed up tightly to be formed as a hollow portion (2), and the other side surface being connected to a suction pipe (6) through a cover member (4) communicating with each hollow hole (2') (hollow portion (2) in an air-tight manner.

In the above described preferred embodiment, the above described materials are blended and the resulting blend is extruded and molded to form the hollow hole (2'). A sectional shape of the hollow hole (2') is shown in FIG. 2. The moisture-absorbing structure (1) is provided with a plurality of parallel hollow holes (2') extending from one side end surface to the other side end surface. It goes without saying that the hollow hole (2') may be opened into merely one side end surface. Although the hollow hole (2') has a rectangular section in the preferred embodiment illustrated, it goes without saying that the shape of the section of the hollow hole (2') is not limited to a rectangular one.

In addition, a sheet-like moisture-absorbing porous material may be disposed up and down and a crosspiece may be disposed between the sheet-like moisture-absorbing porous materials to form the moisture-absorbing structure (1) having the hollow hole (2') as shown in FIG. 2 in respect of facilities and the like.

In addition, in a concrete example of the above described second preferred embodiment, cement, zonotlite, triethylene glycol and water are blended at a ratio of 100:200:35:100 and the resulting blend is molded to form a panel structure of 30×30×5 cm having a hollow hole (2'). A side surface, into which the hollow hole (2') is opened, is sealed up tightly to prepare a moisture-removing penetrating structure ($A_2$) as disclosed in the second preferred embodiment. Upon decompressing the moisture-removing penetrating structure ($A_2$) under the same conditions as in the first preferred embodiment, water was collected at a rate of 6 cc/min.

In a third preferred embodiment, a moisture-insulating layer (3) is provided on one surface of the moisture-absorbing structure (1) according to the second preferred embodiment, the moisture-absorbing structure (1) being processed, and the moisture-insulating layer (3) being formed by stucking resin sheets or films, such as a polyethylene sheet or film or a polypropylene sheet or film, stucking resin sheets and metallic sheets, such as steel plate, applying various kinds of paint, such as a vinyl series paint and an urethane series paint, and the like.

An example of using the third preferred embodiment is shown in FIG. 4. A panel ($A_3$) is mounted on a ceiling through an edge member (7), that is to say the hollow holes (2') are made uniform in direction, solid portions being inserted to combine the panels ($A_3$) with each other, a waterproof tape (8) being stuck to a joint portion of the panels ($A_3$)—over the moisture-insulating layer (3), and as a result, the panels ($A_3$)—being fastened with nails to the edge member (7). In addition, in order to fix end portions of a wall surface (9) and the panel ($A_3$), a sealing material (10) is filled up. Thus, a back surface of the panel ($A_3$) is prevented from absorbing a moisture by the use of the waterproof tape (8) for the joint portion (side of the moisture-insulating layer) of the panel ($A_3$) between themselves and the sealing materials (10) for the end portions of the wall surface (9) and the panel ($A_3$). In addition, one end portion of the panel ($A_3$) (an opened end of the hollow hole (2)) is connected to a discharge duct (11) and a vacuum pump is installed in the duct (11) to discharge the moisture within the hollow hole (2') out of the room. Although the discharge duct (11) is installed on only one side in the preferred embodiment illustrated, it goes without saying that the discharge duct (11) may be installed at both ends. In addition, if a ventilation equipment is used in place of the vacuum pump, the inside of the hollow hole (2') is decompressed.

According to a fourth preferred embodiment, said moisture-absorbing structure (1) is provided with a cover member (4) and said space portion (5) is decompressed. A concrete example of the fourth preferred embodiment is shown in FIGS. 5 to 8. Also the preferred embodiment illustrated in FIG. 2 uses the cover member (4) stuck in the same manner as in the fourth preferred embodiment. The cover member (4) used in the present invention includes single metallic materials (such as an aluminum sheet and baking painted steel plate), molded resin materials (such as acrylic resin, PVC resin and ABS resin), glass and the like without having the moisture-absorbing property as well as plywoods and cement plates of which surface layer is coated with a moisture-nonabsorbing layer, such as a polyolefine sheet and vinyl paint, so as to give the moisture-insulating property.

Figure 5:
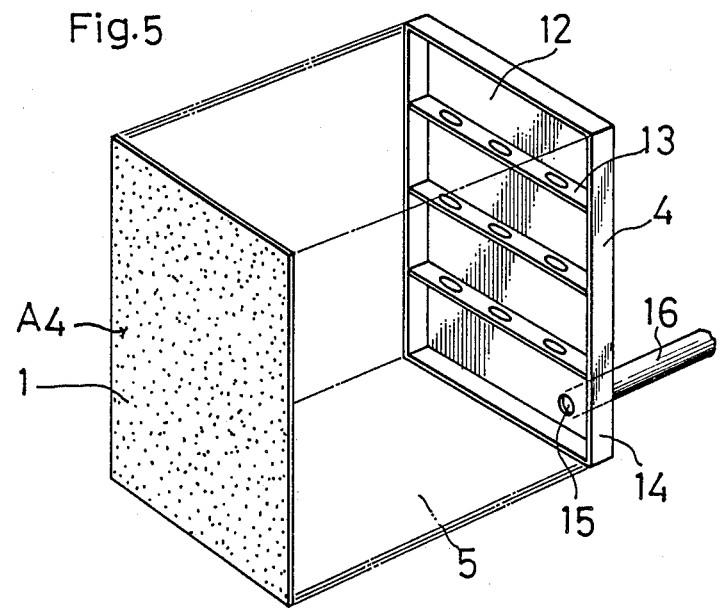
FIG. 5 is a perspective view showing an inside of the fourth preferred embodiment of the present invention.

According to the fourth preferred embodiment of the present invention shown in FIG. 5, the moisture-absorbing structure (1) is formed by molding a blend comprising portland cement, bentonite, $CaCl_2$, diethylene glycol and water at a ratio of 350:700:105:105:500 by weight and provided with an assembly comprising an opposite surface member (12) made of acrylic resins, a perforated reinforcement (13) and a frame member (14) mounted on one surface thereof as the cover member (4), a pipe (16) led out of a moisture-discharging opening (15) being connected to a vacuum pump at a part of the opposite surface member (12).

Figure 6:
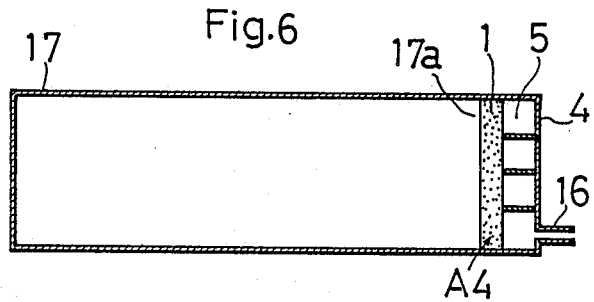
FIG. 6 is a sectional view showing a laboratory moisture-removing apparatus used in the fourth preferred embodiment of the present invention.

An experimental example showing the capacity of a moisture-absorbing penetrating structure ($A_1$) according to the above described fourth preferred embodiment was confirmed by a test sample as shown in FIG. 6. The moisture-absorbing penetrating structure ($A_4$) (comprising the moisture-absorbing structure (1) of 5 mm thick) according to the above described fourth preferred embodiment was mounted on an opened portion (17a) (50×40 mm) of a glass case of which inside was adjusted to 100% in RH and the inside of the glass case was decompressed to an absolute pressure of 50 mmHg by means of the vacuum pump to measure a charge of humidity within the glass case (17) closed up tight.

A moisture-absorbing penetrating structure having the same construction as in the fourth preferred embodiment excepting the at a plywood of 5 mm thick was used in place of the moisture-absorbing structure (1) was used as a comparative example.

The results of the above described experiment are shown in FIG. 7. It was found from FIG. 7 that even though the plywood (comparative example) was a moisture-penetrating material, the relative humidity was not very reduced while the moisture-absorbing structure (1) (preferred embodiment) reduced the relative humidity to 50% or less within several hours, that is to say the latter exhibited a remarkable moisture-removing effect.

In the modification of the fourth preferred embodiment, polyvinyl chloride resin, sodium polyacrylate and plasticizers and the like were blended at a ratio of 36:36:28 and the resulting blend was foamed by heating using the paste calender method to obtain a sheet of 5 (thickness)×150×150 mm. 5 pieces of the resulting sheet were piled up to form the moisture-absorbing structure (1) (having a mean pore-diameter of 1 micron). The pipe (16) was connected to the vacuum pump (absolute pressure: 710 mmHg) and the space portion (5) was subjected to the suction. As a result, water of about 4 g could be collected for 4 hours in the room having a temperature of 17° C. and a RH of 50%.

FIG. 8 shows another example of the fourth preferred embodiment of the present invention which is a modification of FIG. 4. An unevenness is formed on a moisture-absorbing surface and uneven portions of a pair of moisture-absorbing structure (1) with an increased moisture-absorbing surface area are combined. The suction is carried out from an opposite surface space portion (5) of the moisture-absorbing structure (1). The suction is carried out by means of a vacuum pump driven by an electric motor, but it can be done by any kinds of suction means which is normally used in the field of this art.

What is claimed is:

1. A moisture removal apparatus comprising:
a porous body element, at least one internal hollow chamber within said porous body element adapted to collect moisture, said porous body element being formed with continuous fine pore voids having a mean pore-diameter of 10 microns or less, said fine pore voids being filled with moisture-absorbing sorbents, said at least one internal hollow chamber having an outlet for removal of moisture adapted to communicate with a suction pump means for decompressing said at least one internal hollow chamber whereby moisture absorbed by said moisture-absorbing sorbent can be communicated to said at least one internal hollow member for removal through said outlet.

2. The moisture remover as defined in claim 1 wherein said at least one internal hollow chamber communicates with said suction pump means via a suction pipe.

3. A moisture remover comprising:
a porous body element, at least one internal hollow chamber within said porous body element adapted to collect moisture, said porous body element being provided with continuous fine pore voids having a mean pore diameter of 10 microns or less, said fine pore voids being filled with moisture-absorbing sorbent, said hollow chamber having an outlet, whereby moisture absorbed by said moisture-absorbing sorbent is communicated to said at least one internal hollow chamber for removal through said outlet.

4. The moisture remover as defined in claim 3 wherein said continuous fine pore voids have a mean pore diameter of 3 microns or less.

5. The moisture remover as defined in claim 3 wherein the porous body comprises wooden sheet materials selected from the group consisting of plywood, fiber board, article board and sheet paper.

6. The moisture remover as defined in claim 3 wherein the porous body is selected from the group consisting of polyvinyl chloride sheet and polyolefine sheet.

7. The moisture remover as defined in claim 3 wherein the porous body element comprises bentonite and an inorganic material chosen from among the group consisting of plaster, cement, calcium silicate, rock wool, ceramics or sintered material.

8. The moisture remover as defined in claim 3 wherein the porous body element comprises triethylene glycol and an inorganic material chosen from among the group consisting of plaster, cement, calcium silicate, rock wool, ceramics or sintered material.

9. The moisture remover as defined in claim 3 wherein the porous body element comprises bentonite and triethylene glycol and an inorganic material chosen from among the group consisting of plaster, cement, calcium silicate, rock wool, ceramics or sintered material.

10. The moisture remover as defined in claim 3 wherein the porous body comprises inorganic materials selected from the group consisting of plaster, cement, calcium silicate, rock wool, and ceramics or sintered material.

11. The moisture remover as defined in claim 10 wherein the moisture absorbing sorbent comprises deliquescent substances selected from the group consisting of calcium chloride and lithium chloride.

12. The moisture remover as defined in claim 10 wherein the moisture absorbing sorbent comprises water-soluble high molecules selected from the group consisting of diethylene glycol, triethylene glycol, glycerine sodium polyacrylate and PVA.

13. The moisture remover as defined in claim 10 wherein the moisture absorbing sorbent comprises inorganic moisture-absorbing materials selected from the group consisting of bentonite, sepiolite, zeolite, activated alumina, xonotlite, activated carbon and molecular sieves.

14. The moisture remover as defined in claim 10 wherein the moisture absorbing sorbent comprises water-insoluble high molecular moisture-absorbing materials selected from the group consisting of grafted starch, isobtylene maleate anhydride, and grafted starch and isobtylene maleate anhydride in combination.

15. The moisture remover as defined in claim 10 further comprising a moisture-insulating layer provided on the surface of the porous body.

* * * * *